Nov. 9, 1943.   E. O. WANGERIN   2,333,835
WARNING DEVICE FOR CAMERAS WITH VACUUM-TYPE PLATENS
Filed Dec. 30, 1941

ELMER O. WANGERIN
INVENTOR
BY
ATTORNEYS

Patented Nov. 9, 1943

2,333,835

UNITED STATES PATENT OFFICE 2,333,835

WARNING DEVICE FOR CAMERAS WITH VACUUM-TYPE PLATENS

Elmer O. Wangerin, Rochester, N. Y., assignor to Eastman Kodak Company, Rochester, N. Y., a corporation of New Jersey Application December 30, 1941, Serial No. 424,932

9 Claims. (Cl. 95—34)

This invention relates to photographic cameras and more particularly to a camera with a vacuum type platen and an indicating or signal device associated therewith.

The primary object of the present invention is to provide an indicating or signal means for the operator, to indicate the inoperativeness of the air evacuating means or the absence of film in the film gate.

Another object of the invention is to provide an indicating or signal means which will be operated by the supporting member of the air evacuating means when in an abnormal position.

A further object of the invention is to provide an air evacuating means which is connected to the platen engaging the film strip and which is operated in timed relation to the advancement of the film strip.

A still further object is to provide a platen that has a series of cross channels to which the air evacuating means is connected to create a vacuum between the platen and the film strip, and an indicating or signal means which will be operated if the air evacuating means is inoperative or there is no film in engagement with the platen.

Further objects and advantages will be suggested to those skilled in the art by the description which follows.

Reference is hereby made to the accompanying drawing wherein like reference characters designate similar parts and wherein.

Figure 1:
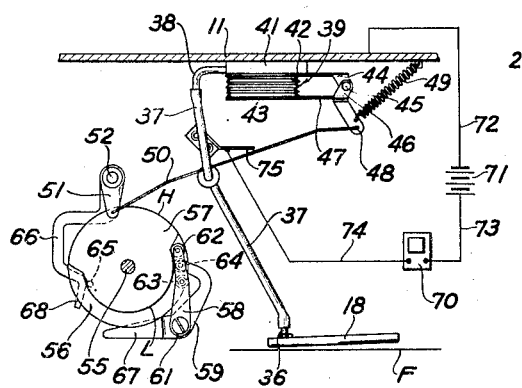
Fig. 1 is a schematic view of the embodiment of the invention described herein.

One great difficulty with vacuum type platens is that the bellows creating the vacuum may become inoperative unbeknown to the operator. The inoperativeness of the bellows is usually due to leaks in the creases of the bellows and, as a result, the bellows will not function properly. Where the film strip forms one side of the chamber from which the air is exhausted, it can be readily appreciated that if there is no film present the evacuating means will not function. In the foregoing instances, the camera will continue to operate without the operator knowing that the bellows has been punctured or that there is no film in the film gate. The present invention corrects these difficulties in that the operator is notified by a signal operated by the abnormal position assumed by the bellows when it is punctured or there is no film in the gate.

In the illustrated embodiment of the invention, the photographic camera comprises a casing 11 which is provided with a partition 12 that divides the camera into a film compartment 13 and a mechanism compartment 14. The film compartment 13 has mounted therein, the supply reel 15 and the take-up reel 16. The film F passes from the supply reel 15 under the guide roll 17, under the platen 18, around the drive roll 19, under the roll 20, and around the loop forming roll 21 to the take-up reel 16.

Figure 2:
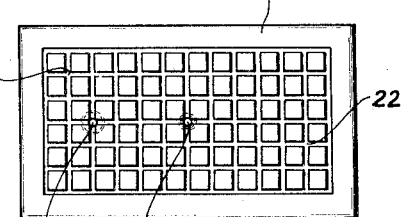
Fig. 2 is a detail bottom view of the platen.
Figure 3:
Fig. 3 is a detail sectional view of the cross channels in the platen.

The platen 18 is provided with a series of cross channels 22, as shown in Fig. 2, the shape of which is best understood by referring to Fig. 3, and the purpose of which will be described hereinafter. The platen is provided with a threaded opening 23 to receive the stud 24 which is carried by the plate 25. The plate 25 is pivotally mounted on the shaft 26, which supports the guide roll 17, by the ears 27 formed up from the plate 25. A spring 28 surrounds the stud 24 to provide a flexible mounting of the platen 18 for the easy passage of splices in the film. A spring 29 on the shaft 26 tends to turn the plate 25 and, hence, the platen 18, in a clockwise direction to maintain the plate 25 in engagement with the lug 30 on the arm 31.

The platen 18 is provided with a second threaded opening 35 to receive the hollow stud member 36, which extends through an opening in the plate 25. A rubber or flexible hose 37, which is secured to the stud 36, passes through the partition 12 from the film compartment 13 to the mechanism compartment 14 where it is secured to the extension 38. The hose 37, therefore, connects the platen member 18 with the air evacuating means 39, of which the extension 38 may be considered to be a part.

The air evacuating means comprises a plate 41 fixed to the casing 11 and to which is fixed the support member 42 carrying one end of the bellows 43. The support member 42 is provided with ears 44 to which are pivotally mounted, at 45, the ears 46 on the support 47 which carries the other end of the bellows 43. The support member 47 has fixed thereto, an arm 48 to which one end of the spring 49 is fixed, the other end of the spring 49 being fixed to the casing 11. The arm 48 also has fixed thereto, the crank rod 50 which connects the arm 48 with the lever 51 fixed to the shaft 52 journalled in the partition 12.

In order to permit the movement of the exposed film past the exposure opening, it is necessary to remove the platen from engagement with the film strip before the film is moved, and after the shutter has been actuated. In a like manner, the platen must engage the film moved into position for the next exposure before the shutter is actuated. It is necessary, therefore, to so time the actuation of the operation of the air evacuating means, that the vacuum will be relieved before the film is moved and will be created before the shutter is actuated.

To accomplish the above synchronization, the motor 54, which is mounted on the partition 12, has mounted on its shaft 55, the disc 56 and the cam member 57. The arm 58 and the bell crank lever 59 are mounted on the shaft 61 journalled in the partition 12, the arm 58 being fixed to the shaft 61 and carrying the rollers 62 and 63, and the bell crank lever 59 being loosely mounted on the shaft 61 and carrying the roller 64 on one end thereof. The disc 56 carries a pin 65 which engages the lever 66 fixed to the shaft 52 to rock the shaft 52 and the lever 51 to operate the bellows in cooperation with the spring 49. The cam member 57 actuates the shutter, which is not shown but which is connected to the arm 67 of the pivotable bell crank lever 59, and also the platen 18 through the arm 58, the shaft 61, and the arm 31 which is also fixed to the shaft 61 in the film compartment 13. The relationship of the various parts with respect to their operation will be described more fully hereinafter.

The indicating means comprises an electrical circuit in which a buzzer 70 is connected in series with the battery 71. One side of the battery 71 is connected by the line 72 to the casing 11 and the other side is connected to the buzzer 70 by the line 73. The line 74 connects the buzzer 70 with the contact member 75, which is mounted on and insulated from the partition 12. From an inspection of Figs. 1 and 4, it can be readily understood that the electrical circuit is closed to operate the buzzer only when the bellows 43 and the support member 47 assume the abnormal position indicated by the dot-dash lines as shown in Fig. 4.

The operation of the above described apparatus will now be described. The position of the various parts, as shown in Fig. 1, may be called the normal position, that is, when the parts are in this position, the film can be threaded through the camera, or the film has been moved to bring the next unexposed frame into position. The motor 54 is running continually, but there is a connection, not shown, between the motor and the drive roll 19 which holds the film in position while the roller 64 is in engagement with the "high" portion H of the cam member 57, the high portion H being the exposure interval. As the motor 54 turns its shaft 55, the disc 56 and the cam member 57 are rotated therewith. As the cam member 57 is rotated, the roller 62 on the arm 58 will be moved out of engagement with the "low" portion L of the cam member 57, the "low" portion being the interval in which the film strip is advanced, onto the "high" portion H. As the arm 58 is moved in a clockwise direction, the arm 31 is rotated in a counter-clockwise direction to move the platen 18 by the lug 30 into a film engaging position against the action of the spring 29, as shown in Fig. 5. At the instant the platen 18 is in engagement with the film strip, the pin 65 rides off the lever 66 and allows the spring 49 to move the bellows 43 to an extended position, as shown in Fig. 4. As the bellows is extended, the air in the series of cross channels 21 is drawn into the bellows 43 through the hose 37 and the openings 40 and 40' in the plate 41, and pulls the film strip evenly against the bottom of the platen 18 to create a vacuum between the film strip and the platen member. When the film strip has been drawn against the platen 18, the roller 64 will engage the "high" portion H of the cam member 57 to move the bell crank lever 59 in a clockwise direction to open the shutter which is connected to the arm 67.

Figure 4:
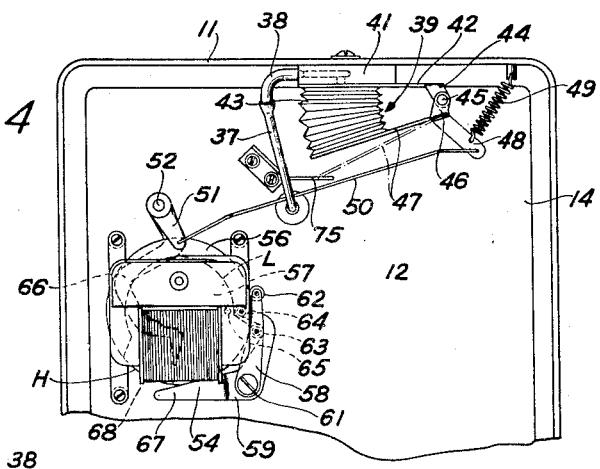
Fig. 4 is a partial side elevation view of the mechanism side of the camera.
Figure 5:
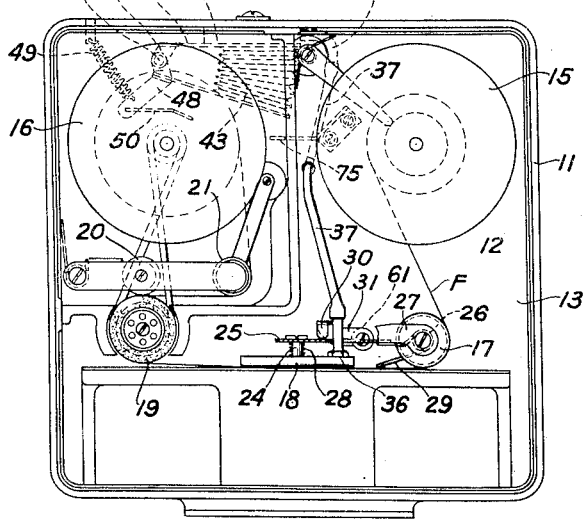
Fig. 5 is a side elevation view of the film side of the camera.
Figure 6:
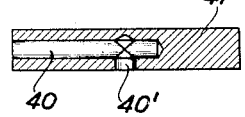
Fig. 6 is a detail sectional view of the plate to which the bellows is mounted and shows the air inlet port.

Referring to Fig. 4, it will be noted that the roller 64 engages the "low" portion L of the cam member 57 first to close the shutter through the counter clockwise movement of the arm 67. The arm 58 is held in its position by the roller 63 until the shutter has been closed, and when the roller 63 rides off the "high" portion H of the cam member 57, the arm 31, through the arm 58 and the shaft 61, is pivoted in a clockwise direction to allow the spring 29 to pivot the platen 18 away from the strip and break the vacuum. It is to be understood that the vacuum created should be sufficient to hold the film strip flat against the platen member without any buckling of the film into the cross channels 21, and should not hold the film strip so tight that it will tear when the platen is moved away therefrom. When the platen 18 has been removed from the film strip, the exposed film is advanced. During the advancement of the film, but before it comes to rest, the pin 65 engages the tail 68 on the lever 66 to rotate the shaft 52 and return the bellows to the position shown in Fig. 1, through the lever 51 and the crank rod 50, against the action of the spring 49. The interval between the removal of the platen and the engagement of the tail 68 by the pin 65 is so small that the bellows does not have time to reach an abnormal position.

The movement of the bellows 43 to its extended or vacuum creating position will depend on the volume of air contained in the hose 37 and the cross channels 21 and will also be dependent on the tightness of the air evacuating means as a whole. Any small leakage will further extend the bellows 43, but may not be enough to extend the bellows to a position where it will come to rest against the contact member 75. Any leakage, however, that may be caused by a severe rupture of the bellows, a loose hose connection, or the absence of film in the film gate will cause the bellows 43 to be extended to an abnormal position due to the spring 49 connected to the arm 48, in which case, the support member 47 will come to rest against the contact member 75 and close the electrical circuit to energize the buzzer 70. The buzzer will indicate any one of the above enumerated faults, which can be corrected by the operator upon stopping the camera.

It is obvious that other mechanical arrangements may be used, and the apparatus described herein is merely illustrative.

Having now particularly described my invention, what I desire to secure by Letters Patent of the United States and what I claim is:

1. In a photographic apparatus, the combination with a hollow platen member adapted to be covered by a film strip, and an air evacuating means connected to said platen member and having a part normally movable to create a vacuum between said platen member and said film strip, said part being movable to an abnormal position when said evacuating means becomes inoperative, of an indicating means arranged to be operated by said part of the evacuating means when said part is in said abnormal position.

2. In a photographic apparatus, the combination with a hollow platen member adapted to be covered by a film strip, and an air evacuating means including a bellows associated therewith and normally movable to create a vacuum between said platen member and said film strip, said bellows being movable to an abnormal position when said evacuating means becomes inoperative, of an indicating means arranged to be operated by said bellows when said bellows is in said abnormal position.

3. In a photographic apparatus, the combination with a hollow platen member adapted to be covered by a film strip, an air evacuating means connected to said platen member and having a part normally movable to create a vacuum between said platen member and said film strip, said part being movable to an inoperative position, and means for moving said part to said inoperative position when said evacuating means becomes inoperative, of an indicating means arranged to be operated by said part of the evacuating means when said part is in said abnormal position.

4. In a photographic apparatus, the combination with a platen member having a series of cross channels adapted to be covered by a film strip to form a vacuum chamber thereby, and an air evacuating means connected to said series of cross channels and having a part normally movable to create a vacuum between said platen member and said film strip, said part being movable to an abnormal position when said evacuating means becomes inoperative, of an indicating means arranged to be operated by said part of the evacuating means when said part is in said abnormal position.

5. In a photographic apparatus, the combination with a platen member having a series of cross channels adapted to be covered by a film strip to form a vacuum chamber thereby, and an air evacuating means connected to said series of cross channels and including a bellows associated therewith and normally movable to create a vacuum between said platen member and said film strip, said bellows being movable to an abnormal position when said evacuating means becomes inoperative, of an indicating means arranged to be operated by said bellows when said bellows is in said abnormal position.

6. In a photographic apparatus, the combination with a pivotably mounted platen member having a series of cross channels adapted to be covered by a film strip to form a vacuum chamber thereby, means for moving said platen member into a film engaging position in timed relation to the movement of said film strip, and an air evacuating means connected to said cross channels and having a part normally movable to create a vacuum between said platen member and said film strip, said part being movable to an abnormal position when said evacuating means becomes inoperative, of an indicating means arranged to be operated by said part of the evacuating means when said part is in said abnormal position.

7. In a photographic apparatus, the combination with a pivotably mounted platen member having a series of cross channels adapted to be covered by a film strip to form a vacuum chamber thereby, means for moving said platen member into a film engaging position in timed relation to the movement of said film strip, an air evacuating means connected to said platen member and including a bellows associated therewith and normally movable to create a vacuum between said platen member and said film strip, said bellows being movable to an abnormal position, a support member for said bellows, and means connected to said support member for moving said bellows to its abnormal position when said evacuating means becomes inoperative, of an indicating means arranged to be operated by a portion of said support member when said bellows is in said abnormal position.

8. In a photographic apparatus having a casing, the combination with a hollow platen member adapted to be covered by a film strip, and an air evacuating means connected to said platen member and having a part normally movable to create a vacuum between said platen member and said film strip, said part being movable to an abnormal position when said evacuating means becomes inoperative, of an indicating means including an electrical circuit, a buzzer connected in series in said circuit, and a contact member on said casing arranged to be engaged by said part of the evacuating means when said part is in said abnormal position to close said electrical circuit, thereby operating said buzzer.

9. In a photographic apparatus having a casing, the combination with a pivotably mounted platen member having a series of cross channels adapted to be covered by a film strip to form a vacuum chamber thereby, means for moving said platen member into a film engaging position in timed relation to the movement of said film strip, an air evacuating means connected to said platen member and including a bellows associated therewith and normally movable to create a vacuum between said platen member and said film strip, said bellows being movable to an abnormal position, a support member for said bellows, and means connected to said support member for moving said bellows to its abnormal position when said evacuating means becomes inoperative, of an indicating means, including an electrical circuit, a buzzer connected in series in said circuit, and a contact member on said casing arranged to be engaged by a portion of said support member when said bellows is in said abnormal position to close said circuit, thereby operating said buzzer.

ELMER O. WANGERIN.